Dec. 28, 1965    B. L. BRYANT    3,225,912
DRYING ASSEMBLY
Filed Nov. 13, 1962
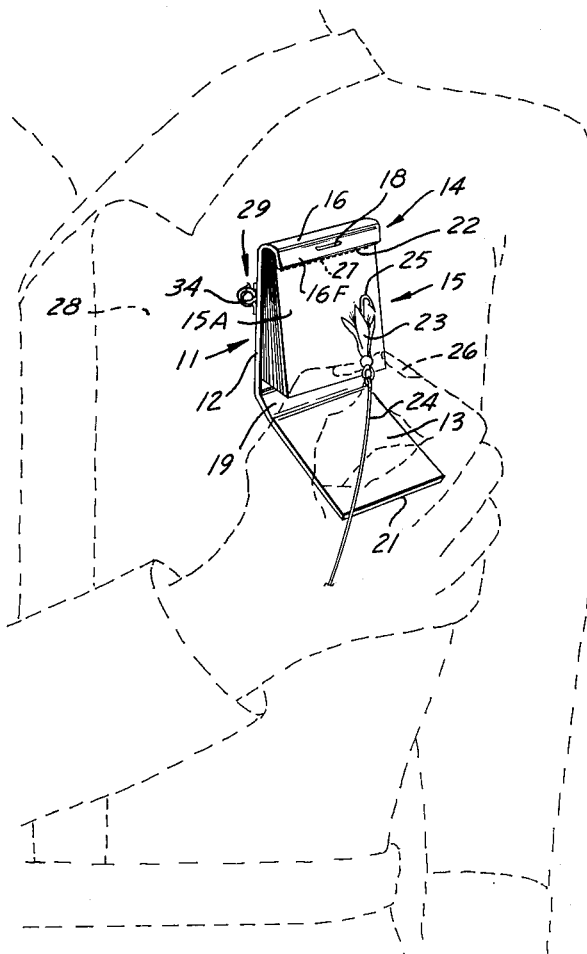
FIG. 1
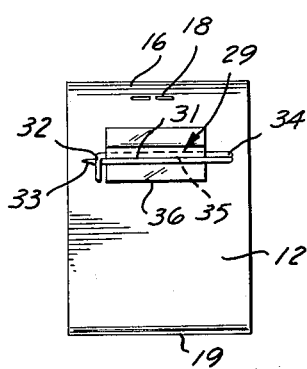
FIG. 4
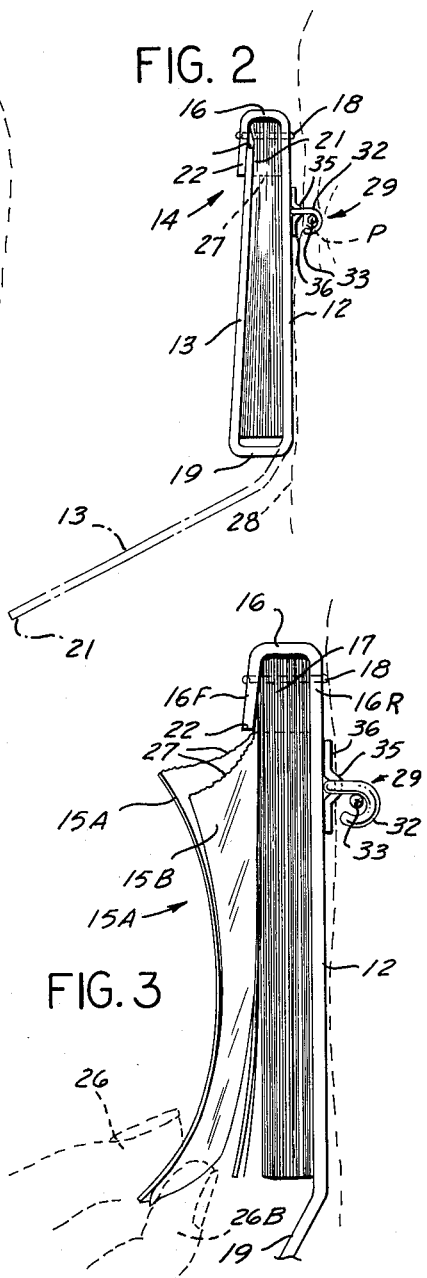
FIG. 2
FIG. 3
INVENTOR.
BEN L. BRYANT … # 3,225,912
DRYING ASSEMBLY
Ben L. Bryant, Los Angeles, Calif.
(385 Weymouth Place, Laguna Beach, Calif.)
Filed Nov. 13, 1962, Ser. No. 237,189
1 Claim. (Cl. 206—37)

Generally speaking, the present invention relates to an assembly of a plurality of individually usable, removable and disposable absorbent means and, more particularly, pertains to such an assembly which is carried by a container or package of the controllably openable and closable type and which is provided with means for mounting the entire device in a convenient position on the front part of a torso-covering garment worn by a person intending to use the device, usually for drying a fishing fly of the artificial lure type used in fly casting and which must be absolutely dry if it is to float upon completion of the cast. In other words, if such an artificial fishing fly is wet prior to casting same, it will normally sink into the water of a lake or stream which will virtually completely destroy the effectiveness of the artificial fishing fly as a lure for fish such as trout or the like.

The customary prior art practice by fishermen, when fly casting, has normally been to employ a front portion of the fisherman's shirt for drying the artificial fishing fly just prior to casting same. However, this is an extremely makeshift type of arrangement and not particularly satisfactory, since it is difficult to accomplish the drying job because of the fact that the shirt front is not free and, therefore, cannot be effectively placed in contact with various portions of the artificial fishing fly which are to be dried.

Another prior art arrangement has been to use a handkerchief, a facial tissue, a paper hand towel, or various other absorbent materials for the purpose of drying the artificial fishing fly prior to casting same. However, this has also been unsatisfactory because the drying members just referred to are all large and unwieldy and difficult to handle with respect to a relatively small artificial fishing fly.

Furthermore, after use, they are too large to conveniently dispose of and must normally be placed in the fisherman's pocket until it is to again be used. This will require removal of it and again handling the large, unwieldy bulk thereof during the next drying operation.

Furthermore, the above-mentioned prior art practice does not necessarily insure that one of the prior art elements will be completely dry after a considerable period of fishing has occurred and after a number of artificial fishing fly-drying operations of the above-mentioned type have been performed. One may inadvertently grasp an already moistened portion of the large, unwieldy prior art type of drying element mentioned above and may again apply this to the artificial fishing fly, which will not result in drying same to a satisfactory extent for effective fly casting performance and subsequent flotation of the artificial fishing fly on the surface of the water.

The novel, controllably openable and closable assembly of the plurality of removable absorbent means of the present invention is particularly well adapted to solve the above-mentioned prior art problems since it provides a container or package of relatively small size and means for mounting same on the front portion of a fisherman's shirt or jacket in a very convenient location, and since it is of a nature such that it can be easily opened to place a front small absorbent panel in a position for effective artificial fishing fly-drying use, after which it can be removed and disposed of, thus placing the next absorbent panel, which was previously positioned therebehind, in position for the next or subsequent artificial fly-drying usage.

Also, in one preferred form of the present invention, each of the plurality of absorbent panels is arranged in stacked or area-contiguous relationship with a plurality of water-impervious thin-sheet separators or separator panels mounted therebetween in intervening relationship with respect to adjacent ones of said absorbent panels whereby to prevent a front-positioned absorbent panel, after use in drying an artificial fishing fly, from causing water to be transported rearwardly into the second absorbent panel positioned immediately therebehind. This is positively prevented by the intervening water-impervious separator panel.

Thus, it will be seen that each panel is positioned for effective artificial fly-drying usage and yet is so arranged as to in no way whatsoever moisten any of the other absorbent panels of the entire assembly thereof.

Of course, it should be understood that after use of the front absorbent panel, it, together with the water-impervious separator panel immediately therebehind, are both torn out of the assembly of panels and disposed of. In one preferred form of the invention, this is facilitated by the provision of weakened tear line means carried by the absorbent panels and the separator panels at substantially parallel locations adjacent to fastened similar ends thereof, thus making it possible to conveniently and easily tear out a pair of panel members consisting of a front-positioned absorbent panel and a water-impervious separator panel positioned immediately therebehind, after an artificial fly-drying operation.

It is an object of the present invention to provide multiple-use absorbent panel means, and container means therefor, of the general type broadly referred to above and/or of any of the various specific types or forms thereof referred to above.

It is a further object of the present invention to provide multiple-use absorbent panel means, and container means therefor which is particularly well adapted to be mounted on a fisherman's jacket or shirt by suitable mounting means carried at the back thereof and which is adapted to be controllably opened whereby to place an absorbent panel at a conveniently accessible location ideally suited for drying an artificial fishing fly; the arrangement being such that after each fly-drying operation the moistened and used panel can be removed and a fresh one therebehind exposed for the next subsequent artificial fly-drying operation.

It is a further object of the present invention to provide a device of the character referred to in the preceding object wherein each pair of the absorbent panels is provided therebetween with water-impervious separator panel means for preventing the passage of liquid from one absorbent panel member to another.

It is a further object of the present invention to provide a device of the character referred to above including a wrap-around container or package means including a back portion, a controllably openable and closable front portion, an effectively interconnecting hinge portion between said front and back portions and effectively hingedly connecting same, and fastening means for fastening a plurality of said panel members within said container immediately in front of said back portion of said container means.

It is a further object to provide a device of the character referred to in the preceding object including retaining means cooperable with a free end edge portion of said front cover portion of said wrap-around container means for effectively retaining same in closed relationship and for allowing controllable digital disengagement thereof for opening the entire container when desired.

It is a further object of the present invention to provide a device of the character referred to hereinbefore wherein each of the panels is effectively provided with weakened tear line means for facilitating the forcible removal thereof by tearing same out of the normal assembled mounted relationship with respect to the container means.

It is a further object to provide an improved multiple-element absorbent means of the character referred to above which is of relatively inexpensive, simple, foolproof, easy-to-use, and disposable (as to the individual panels) construction whereby to be conducive to widespread use thereof.

Further objects are implicit in the detailed description which follows hereinafter for exemplary rather than limiting purposes and will be apparent to persons skilled in the art after a careful study thereof.

For the purpose of clarifying the nature of the present invention, one exemplary embodiment is illustrated in the hereinbelow-described figures of the accompanying single drawing sheet and is described in detail hereinafter.

FIG. 1 is a perspective view illustrating one exemplary embodiment of the invention in mounted relationship on a fisherman's jacket or shirt (shown in phantom) and illustrates the device with the front cover portion of the wrap-around container or package means in open relationship, exposing the front absorbent panel of the plurality thereof for artificial fly drying use, as is shown in phantom in FIG. 1.

FIG. 2 is a larger-scale, right side elevational view of the exemplary embodiment of the invention as illustrated in FIG. 1. However, in this view the artificial fishing fly and the fisherman's hand are removed for reasons of drawing simplification and clarity.

FIG. 3 is a larger-scale, fragmentary, side elevational view similar to FIG. 2 but illustrates the removal of the front absorbent panel and the water-impervious thin-sheet separator panel immediately therebehind from the assembled structure by digitally applying force to the remote bottom free ends thereof whereby to tear them along the tear line means shown at the top thereof in a manner such as to remove them completely from the remainder of the structure shown in FIG. 3. This is normally done after a fly-drying operation has occurred and the front absorbent panel has been moistened thereby.

FIG. 4 is a rear elevational view of the exemplary embodiment of the invention showing one typical form of mounting means for mounting the entire device with respect to the front of the fisherman's jacket or shirt as shown in FIG. 1.

Referring to the figures for illustrative purposes, one exemplary but non-specifically limiting embodiment of the invention takes a typical illustrative form wherein it comprises a controllably openable and closable container or package means indicated generally at 11, having a back portion 12 and a controllably openable front portion 13 and being provided with fastening means generally indicated at 14 adjacent one end thereof for firmly mounting similar ends of a plurality of panels, indicated generally at 15.

The plurality of panels or panel members 15 consists of a first group of substantially rectangular thin sheet absorbent panels 15A and a second group of similarly substantially rectangular thin sheet panels 15B which are water-impervious or substantially so. The panels 15A and 15B are arranged in alternating relationship such that a water-impervious separator panel 15B lies between each two adjacent absorbent panels 15A whereby to effectively isolate said two adjacent water absorbent panels 15A from each other insofar as the transmission of liquid from one to the other is concerned—the water-impervious separator panel 15B positioned therebetween acting as a complete bar to the transmission of moisture therethrough.

In the exemplary and non-specifically limiting form of the invention illustrated, the above-mentioned fastening means, indicated generally at 14, comprises a curved, trough-shaped portion 16 adapted to receive therein similar ends, such as indicated at 17, of the panels 15 (including both the absorbent panels 15A and the water-impervious separator panels 15B), and also includes joining means which, in this exemplary form, is shown as comprising a staple 18 joining front and rear parts 16F and 16R of said curved, trough-shaped portion 16 together with said ends 17 of all of the panels 15 firmly locked therebetween. This is best shown at the top of FIG. 3.

It should be noted that the junction means 18 is exemplary only and the invention is not to be construed as specifically limited thereto. Actually, various other kinds of junction means including adhesive means, cohesive means, and/or various other types of physical, mechanical, junction or fastening means may be employed in lieu of the staple 18 and, indeed, in lieu of the entire fastening means 14 in certain forms of the invention.

It should be noted that, in the specific form of the invention illustrated, the controllably openable and closable container or package means 11 is of a special wrap-around type wherein the back portion 12 and the removable front cover portion 13 are effectively joined together by what might be termed a hinge portion 19 which, however, is of considerable extent in depth so as to encompass the thickness of the complete assembly of the free ends of all of the panels or panel members 15 within the container 11 when in the closed relationship shown in solid lines in FIG. 2.

In the specific exemplary arrangement illustrated, the front cover portion 13 of the container 11 has a remote end edge 21 which is fasteningly and retainingly cooperable with respect to a retention lip 22 comprising the lower free end of the forward part 16F of the curved, trough-shaped portion 16 at the top of the entire container 11. The arrangement is such that said free end edge 21 is adapted to be inserted under said retaining lip 22 and to be retained therein in the manner best shown in solid lines in FIG. 2 until it is manually and digitally removed therefrom into an open position such as is shown in phantom in FIG. 2 and in solid lines in FIGS. 1 and 3.

This type of disengagement places the front absorbent panel 15A in a forwardly positioned, conveniently accessible location for artificial fishing fly-drying use in the manner best shown in FIG. 1 wherein an artificial fishing fly 23 carried by a fishing line 24 adjacent to a fishing hook 25 is shown in the act of being digitally pressed against the front absorbent panel 15A by the fingers and thumb shown in phantom at 26 in FIG. 1.

Upon completion of such a fly-drying operation, the now moistened front panel 15A and the water-impervious separator panel 15B lying immediately therebehind can be jointly removed by digitally grasping the bottom free ends thereof by thumb and fingers as shown in phantom at 26 in FIG. 3 and by then applying tension thereto. This will cause said two front panels 15A and 15B to be torn along the weakened severing line means 27 thereof so as to be completely removed from the remaining assembly of the panels 15, after which the removed front panels 15A and 15B may be thrown away or otherwise disposed of, perhaps in a trash receptacle or the like, or they may be burned in the fisherman's campfire.

Incidentally, it should be noted that all of the panels 15 (including both the absorbent panels 15A and the intervening water-impervious separator panels 15B) are provided with similar weakened tear line means 27, which may be of any suitable type, such as multiple perforations, portions of thinner effective cross-section, or various other equivalent arrangements.

After completion of use of the entire device it is normally closed by closing the front cover means 13 into the closed relationship shown in solid lines in FIG. 2.

The exemplary and non-specifically limiting form of the invention shown in the figures of the drawing and described herein includes mounting means for mounting the entire device at a desired location, such as the front of a shirt or jacket or other torso-covering garment adapted to be worn by a fisherman or the like. Such a jacket is shown in phantom at 28 in FIG. 1, but is not to be construed as specifically limiting the invention to cooperative use with respect thereto only.

In the exemplary form of the invention illustrated, said mounting means is generally designated by the reference numeral 29 and comprises a controllably openable and closable garment-engageable mounting clasp means which includes, in this specific example, a pointed, movable, resiliently cantilever-mounted pin element 31 adapted to penetrate a small, bunched-up portion P of fabric at the front of the garment 28 and also includes a retaining loop element 32 adapted to receive the forward pointed end 33 of said pointed movable pin element 31 after it has been passed through said portion P of said garment 28 whereby to firmly mount the entire device with respect to the front of said garment 28 in the manner best shown in FIGS. 2 and 3.

In the specific exemplary form illustrated, the cantilever mounting of said movable pin element 31 is provided by resilient spring means 34 at the back end thereof which connects a base mounting portion 35 underneath a panel 36 which is fixed to the back of the back portion 12 of the container or package 11 in any suitable manner. This provides an arrangement such that the movable pin portion 31 is normally spring biased rearwardly so as to normally forcibly abut the rear portion of the retaining loop element 32, when in the fastened relationship shown in FIGS. 2 and 3.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

An artificial fishing fly-drying assembly, comprising: a controllably openable and closable container having a back portion, a controllably openable front portion, fastening means adjacent to one end thereof and a plurality of flat, thin absorbent sheets lying in adjacent, substantially area-contiguous parallel relationship and having similar ends thereof firmly fastened by said fastening means with respect to said back portion of said container adjacent to said one end thereof with the opposite remote ends of said sheets being positioned in area-contiguous but freely digitally graspable and displaceable relationship with respect to each other and being positioned adjacent to the opposite end of said back portion of said container; and a plurality of flat, thin, water-impervious separator sheets, having the same dimensions as said absorbent sheets, mounted by said fastenening means in intervening alternating relationship with respect to said plurality of absorbent sheets, with each pair of adjacent absorbent sheets separated by an intervening water-impervious separator sheet, said water-impervious separator sheet preventing a front-positioned absorbent sheet, after use in drying an artificial fishing fly, from causing water to be transported rearwardly into the next absorbent sheet positioned immediately therebehind; each of said sheets having a weakened tear line therein, said tear lines being in parallel aligned relationship to each other and being positioned closely adjacent to said fastening means, whereby to provide for forcible removal of a particular one of said plurality of water-impervious separator sheets along with the absorbent sheet lying immediately in front thereof; said container comprising a thin-sheet of flexible wrap-around material including said back portion, said controllably openable front portion, and an interconnecting hinge portion longitudinally spaced from said fastening means; said fastening means comprising a curved trough-shaped portion receiving and mounting similar fastened ends of said plurality of absorbent sheets and intervening alternating water-impervious separator sheets and a staple joining front and rear parts of said trough-shaped portion together with said ends of said sheets firmly secured therebetween; said back portion of said container having openable and closable garment-engageable means secured thereto for mounting the entire assembly on a selected portion of a garment.

References Cited by the Examiner

UNITED STATES PATENTS

| | | | |
|---|---|---|---|
| 990,270 | 4/1911 | Hudson. | |
| 1,525,860 | 2/1925 | Flynn. | |
| 1,543,283 | 6/1925 | Falor et al. | |
| 1,873,610 | 8/1932 | Lyon. | |
| 1,885,076 | 10/1932 | Bustamente. | |
| 2,005,676 | 6/1935 | Hanover. | |
| 2,029,245 | 1/1936 | Lyon. | |
| 2,035,196 | 3/1936 | Schiek. | |
| 2,214,510 | 9/1940 | Robinson. | |
| 2,222,020 | 11/1940 | Eaves. | |
| 2,472,344 | 6/1949 | Rosenbarger | 206—37 |
| 2,491,166 | 12/1949 | Di Stiso | 206—37 |
| 3,033,359 | 5/1962 | Mercer. | |

LOUIS G. MANCENE, *Primary Examiner.*

THERON E. CONDON, GEORGE O. RALSTON,
*Examiners.*